Sept. 8, 1936.  A. L. PARKER  2,053,626

ELASTIC COUPLING FOR TUBES

Filed May 23, 1935

Inventor
Arthur L. Parker
By Mason & Porter
Attorneys

Patented Sept. 8, 1936

2,053,626

UNITED STATES PATENT OFFICE 2,053,626

ELASTIC COUPLING FOR TUBES

Arthur L. Parker, Cleveland, Ohio

Application May 23, 1935, Serial No. 23,125

2 Claims. (Cl. 285—90)

The invention relates to new and useful improvements in an elastic coupling which may be used for joining a tube to another part or for joining two tubes in a line.

An object of the invention is to provide a coupling wherein the tube is connected thereto solely through a resilient member which makes elastic contact with the tube and the expanded end thereof.

A further object of the invention is to provide an elastic coupling of the above type wherein the resilient member is attached to the coupling solely through the gripping engagement of the coupling with a laterally projecting flange on the resilient member so that the tube may shift to different angular positions relative to the axis of the coupling through the flexing of said flange.

A still further object of the invention is to provide an elastic coupling of the above type wherein the resilient member is so enclosed in a metallic casing as to prevent fluid passing through the tube and coupling from contacting with said resilient member.

These and other objects will in part be obvious and will in part be hereinafter more fully disclosed.

In the drawing which shows by way of illustration one embodiment of the invention—

Figure 1:
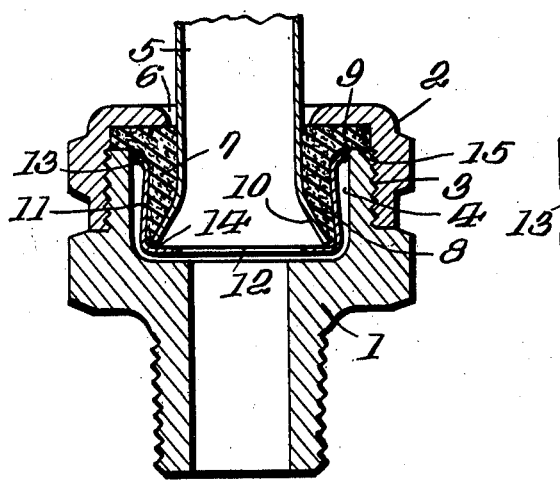
Figure 1 is a longitudinal sectional view through a coupling embodying the improvements and showing a tube end clamped to the coupling.

The invention has to do with an elastic coupling for tubes or pipes and resides broadly in the manner of securing the tube to the coupling members so as to provide a connection which is liquid-tight and which will permit the tube to shift to different angular positions relative to the axis of the coupling members. The elastic coupling includes metallic members which have a threaded connection, although the manner of connecting the coupling members forms no part of the present invention. These coupling members have a recess which is adapted to receive the expanded end of a tube which is to be attached thereto. Surrounding the tube is a resilient member in the form of a sleeve which is so dimensioned that it may be stretched over the tube end and have a tight holding connection therewith. The resilient sleeve is provided with a projecting flange and the coupling members are so constructed as to grip and firmly clamp the flange, and this serves as the sole connection between the resilient member and the metallic coupling members. The tube end does not contact with the coupling members under normal conditions. Surrounding the resilient sleeve is a metallic housing which prevents any liquid conveyed through the tube and coupling from contacting with the resilient member. It also serves to restrain the resilient member so that the shifting of the tube to different angular positions is accomplished solely through the flexing of the flange supporting the resilient sleeve.

Referring more in detail to the present illustrated embodiment of the invention, the coupling consists of a male member 1 and a female member 2 which have a threaded connection indicated at 3. These members may be constructed in any suitable way and connected by other means than threads. It is essential, however, that the members, when joined, shall provide a recess which is indicated at 4. A tube to be attached to the coupling is indicated at 5. The female member 2 is provided with an opening 6 which is larger than the diameter of the tube. This female member is slipped on to the tube before the end thereof is flared.

A resilient member in the form of a sleeve serves as the sole means for connecting the tube to the male and female coupling members. This resilient sleeve is indicated at 7 in the drawing. The sleeve is tapered at one end so as to conform to the taper which is given to the end of the tube. The tapered portion just referred to is shown at 8 in the drawing. The resilient sleeve is also provided with a projecting flange 9. While the flange is shown at the opposite end of the resilient sleeve from the tapered portion, it is understood that it may be otherwise placed on the resilient sleeve. It is essential, however, that it shall project laterally from the body of the resilient sleeve. This resilient sleeve is stretched over the tube end, after which the tube end is flared as indicated at 10.

Figure 5:
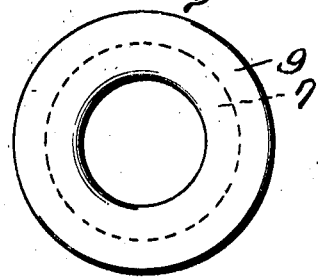
Fig. 5 is a top plan view of the resilient member shown in Fig. 4.
Figure 6:
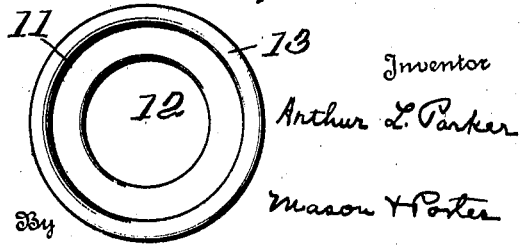
Fig. 6 is a bottom plan view of the same.

A metal housing is provided for the resilient sleeve. This metal housing is indicated at 11 in the drawing. Said housing is cup-shaped, but is provided with an opening 12 in the bottom thereof. It is also curved outwardly into a flange 13 at the other end. This cup-shaped housing is slipped on to the body portion of the resilient sleeve 7, after which a spinning tool is applied thereto so that the body portion of the housing is bent inwardly, slightly compressing the resilient sleeve. This firmly joins the housing 11 to the resilient sleeve, as shown in Fig. 5 of the drawing. It will be noted that the tube end contacts with the housing along a line indicated at 14.

Figure 2:
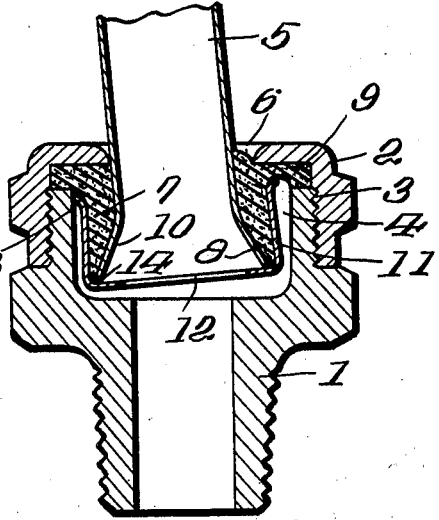
Fig. 2 is a view similar to Fig. 1, but showing the tube as shifted to an angular position relative to the axis of the coupling.
Figure 3:
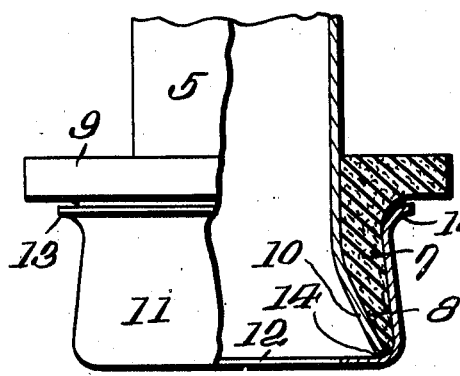
Fig. 3 is a view showing the tube end with the resilient member applied thereto and the metal housing attached to the resilient member preparatory to the inserting of the unit thus assembled in the coupling.
Figure 4:
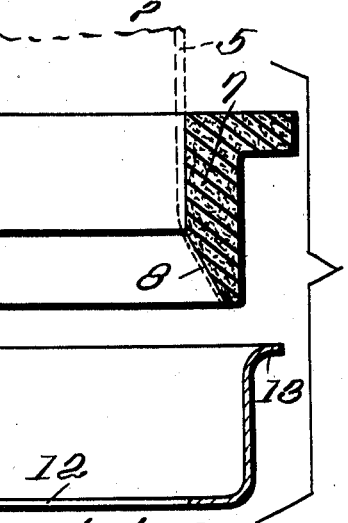
Fig. 4 is a view showing the resilient sleeve and the metal housing therefor detached, and in broken lines, the tube end with which the resilient member makes elastic contact.

After the parts have been assembled in the manner above described, then the tube end is placed in the recess 4 and the flange 9 brought into contact with the end 15 of the male coupling member. The female coupling member is then threaded on to the male member and will clamp the flange 9 so that it will be firmly gripped between the two coupling members and thus supported. When the parts are assembled as shown in Fig. 1, the housing 11 is out of contact with the male member. This housing which surrounds the resilient member or sleeve will protect the same from contact with the fluid in the circuit, and any pressure on the tube tending to expel it from the flexible or resilient sleeve will not stretch said sleeve, as it is restrained by this housing. The parts are so dimensioned that the space between the metallic housing 11 and the end of the recess or cavity in the coupling members is small so that if there is any longitudinal pressure tending to press the tube into the fitting further than determined by the position of the flange on the flexible member, such movement of the tube is limited to the amount of the clearance. At the same time, the clearance is sufficient so that the tube may rock to the prescribed limiting angle from ten degrees to fifteen degrees, as illustrated in Fig. 2, without having any frictional contact between the end of the tube assembly and the base of the recess in the body of the coupling. The entire flexing of the resilient member is confined to the flange or diaphragm portion of said member, and there is no flow of the material forming the resilient member when the tube is flexed, and therefore, the tube may be bent out of alinement with minimum resistance.

While the invention is illustrated as applied to the joining of a tube to a coupling member that is adapted to be attached to some other part, it will be understood that by slight modifications of the coupling members, the ends of two tubes may be connected so that they may be readily shifted to different angular positions. It is obvious that many changes in the details of construction and the arrangement of the parts may be made without departing from the spirit of the invention as set forth in the appended claims.

Having thus described the invention, what I claim as new and desire to secure by Letters Patent, is—

1. An elastic coupling for tubes including metallic coupling members having therebetween a recess adapted to receive the expanded end of a tube, a resilient sleeve surrounding the tube and elastically contacting with the tube and the expanded end thereof, said resilient sleeve having a laterally projecting flange, a metallic housing enclosing the resilient sleeve between the flange and the inner end of said sleeve, said housing being dimensioned so as to grip the sleeve, and said coupling members having means for gripping the flange of said resilient sleeve for supporting the sleeve and tube with the tube and housing free from contact with either of the coupling members whereby the tube is free to shift to different angular positions relative to the axis of the coupling through the flexing of the flange of the sleeve.

2. An elastic coupling for tubes including metallic coupling members having therebetween a recess adapted to receive the expanded end of a tube, a resilient sleeve surrounding the tube and elastically contacting with the tube and the expanded end thereof, said resilient sleeve having a laterally projecting flange, a metallic housing enclosing the resilient sleeve between the flange and the inner end of said sleeve, said housing being dimensioned so as to grip the sleeve, said coupling members having means for gripping the flange of said resilient sleeve for supporting the sleeve and tube with the tube and housing free from contact with either of the coupling members whereby the tube is free to shift to different angular positions relative to the axis of the coupling, said metallic housing serving to restrain the resilient sleeve so that the shifting of the tube to different angles is accomplished solely through the flexing of the flange supporting the resilient sleeve.

ARTHUR L. PARKER.